United States Patent [19]

Suzuki et al.

[11] Patent Number: 4,643,227

[45] Date of Patent: Feb. 17, 1987

[54] LINEAR SOLENOID-OPERATED VALVE FOR USE IN POWER STEERING SYSTEM

[75] Inventors: Mikio Suzuki, Hekinan; Shigeo Tanooka, Okazaki, both of Japan

[73] Assignee: Toyoda Koki Kabushiki Kaisha, Kariya, Japan

[21] Appl. No.: 788,723

[22] Filed: Oct. 17, 1985

[30] Foreign Application Priority Data

Oct. 25, 1984 [JP] Japan ................. 59-225515

[51] Int. Cl.$^4$ ...................... F16K 31/06; F16K 47/04
[52] U.S. Cl. ................................ 137/625.38; 251/118; 251/129.07; 251/129.08
[58] Field of Search .............. 251/118, 129.07, 129.08; 137/625.38

[56] References Cited

U.S. PATENT DOCUMENTS

| | | | |
|---|---|---|---|
| 2,744,386 | 5/1956 | Gerwig | 251/118 X |
| 3,084,718 | 4/1963 | Ash | 251/118 X |
| 4,274,504 | 6/1981 | Kawabata et al. | 180/143 |
| 4,471,811 | 9/1984 | Kawabata et al. | |

Primary Examiner—Arnold Rosenthal
Attorney, Agent, or Firm—Oblon, Fisher, Spivak, McClelland, & Maier

[57] ABSTRACT

A linear solenoid-operated valve which includes a housing having a first and second ports opening into a bore, and a cylindrical spool formed with a through hole and axially slidable in the bore. A slot is formed at one end of the spool so as to define in combination with the first port a bypass passageway operable to a variable degree upon axial movement of the spool. A chamfer is formed on an intermediate surface of the spool in a direction toward the through hole. A restrictor having an orifice formed therein is provided at the one end of the spool. The spool is spring-biased in a direction to close the bypass passageway, and is shiftable by an energized solenoid to open the bypass passageway.

3 Claims, 5 Drawing Figures

TORQUE FOR COUNTER-  0  TORQUE FOR CLOCKWISE TURN
CLOCKWISE TURN

LINEAR SOLENOID-OPERATED VALVE FOR USE IN POWER STEERING SYSTEM

BACKGROUND OF THE INVENTION

1. Field of the Invention

The present invention relates to a solenoid-operated valve which is responsive to electric current supplied to a solenoid or coil so as to linearly control fluid flow from a high-pressure passage into a low-pressure passage, and more particularly relates to a linear solenoid-operated valve for use in a speed-responsive power steering system for motor vehicles which is capable of controlling a steering force in response to variables such as vehicle speed.

2. Discussion of the Background

In general, in a speed-responsive power steering system in which a steering force is controlled in response to variables such as vehicle speed, a linear solenoid-operated valve is used which linearly controls fluid flow from a high-pressure passage to a low-pressure passage.

FIG. 1 illustrates two separate flow patterns which occur in a conventional linear solenoid-operated valve similar to U.S. Pat. No. 4,471,811 and which comprises a valve housing 10 having a bore 11 in which there is axially slidably fitted a cylindrical spool 20 having at a lower end thereof slots 21, 21 extending diametrically thereacross. Valve housing 10 has a first passage P1 opening into bore 11 and a second passage P2 extending coaxially from bore 11. Slots 21 serve as bypass passageways 22 that respectively extend between first and second passages P1, P2 and which are throttled as spool 20 moves axially within bore 11. Namely, bypass passgeways 22 are defined with side walls and end wall 21a and a side wall of first passage P1.

In such linear solenoid-operated valve, when the velocity of fluid flow through slots 21 is rapid, pressure acting on bottom surfaces 21a of slots 21 becomes comparatively small in accordance with Bernoulli's equation. Therefore, when pressurized fluid flows at time $t_1$ from first passage P1 to second passage P2, a first reaction force F1 acts on spool 20 in a downward direction in FIG. 1, so as to throttle bypass passageway 22. When the pressurized fluid flows reversely at time $t_2$ from second passage P2 to first passage P1, a second reaction force F2 also acts on spool 20 in the same direction. In addition, second reaction force F2 is greater than first reaction force F1 because of the difference in the directions of fluid flow. As a result, an imbalance or unevenness exists between the first and second output pressures or steering forces which are respectively generated when the steering wheel is turned clockwise and counterclockwise, as shown by the double-dot-and-dashed line in FIG. 5.

In order to diminish the aforementioned imbalance between the first and second steering forces, a linear solenoid-operated valve is utilized wherein an end plate D having an orifice D1 formed therein is attached to the lower end of spool 20 as shown by the double-dot-and-dashed line in FIG. 1. In such linear solenoid-operated valve, a first thrust force is added to first reaction force F1 when the fluid flows from first passage P1 to second passage P2 because the pressure which acts on an upper end surface of spool 20 becomes greater than the pressure which acts on a lower end surface of end plate D according to a pressure drop across orifice D1. To the contrary, a second thrust force due to the inverse pressure drop across orifice D1 serves to counteract second reaction force F2 when the fluid flows from second passage P2 to first passage P1, so as to cancel the difference between first and second reaction forces F1, F2.

However, some difficulties have been encountered in fully cancelling the imbalance between first and second steering forces, which is respectively generated upon clockwise and counterclockwise rotation of the steering wheel, when merely providing the orifice. One problem in such linear solenoid-operated valve is that when the fluid flows from first passage P1 to second passage P2, the degree of stagnation of fluid at the end walls 21a of slots 21 changes significantly in accordance with the variation in the degree of opening of bypass passageway 22 and as a result, first reaction force F1 changes a greater amount according to the position of spool 20 than second reaction force F2. Another problem is that when the fluid flows from second passage P2 to first passage P1, the lower portion of spool 21 is elastically outwardly deformed by the pressure introduced into the interior of spool 20, whereby the resistance to the sliding motion of spool 20 varies in accordance with the variation of fluid pressure.

SUMMARY OF THE INVENTION

It is therefore an object of the present invention to provide an improved linear solenoid-operated valve wherein the imbalance between first and second steering forces, which are respectively generated upon clockwise and counterclockwise turns of a steering wheel, is sufficiently cancelled.

Another object of the present invention is to provide an improved linear solenoid-operated valve wherein the difference between first and second reaction forces which respectively act on a spool upon clockwise and counterclockwise turns of a steering wheel is satisfactory cancelled.

A further object of the present invention is to provide an improved linear solenoid-operated valve wherein outward elastical deformation of a spool is prevented so as to avoid an imbalance between first and second steering forces.

Briefly, according to the present invention, these and other objects are achieved by providing a linear solenoid-operated valve which includes a housing having first and second ports opening into a bore, and a cylindrical spool formed with a through hole and which is axially slidable in the bore. A slot is formed at one end of the spool so as to define a bypass passageway with side walls and an end wall thereof and a side wall of the first port. The bypass passageway extends between the first and second ports, and is variable as to its degree of opening upon axial movement of the spool. A chamfer is formed on the intermediate end wall of the spool in the direction of the through hole. A restrictor formed with an orifice is provided at one end of the spool. The spool is spring-biased in a direction to close the bypass passageway, but is shiftable by an energized solenoid so as to open the bypass passageway.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

A linear solenoid-operated valve according to the present invention will now be described with reference to FIGS. 2 through 5.

Figure 2:
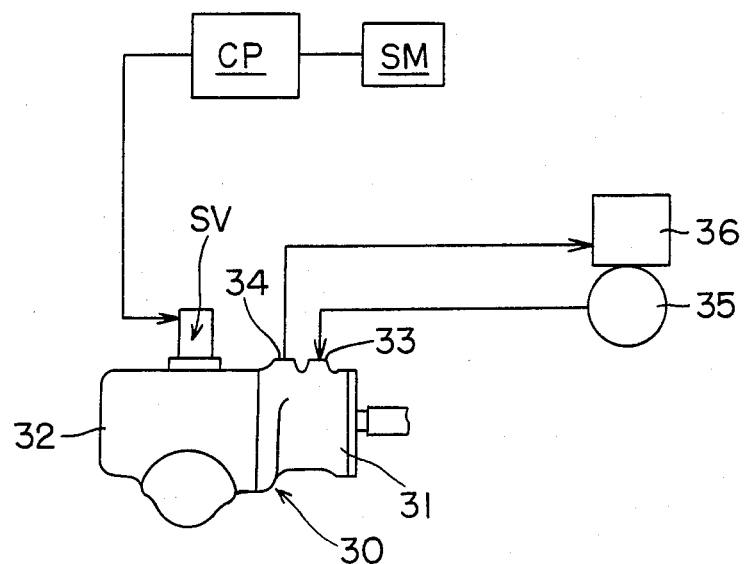
FIG. 2 is a diagrammatic view of a speed-responsive power steering system in which a linear solenoid-operated valve according to the present invention is incorporated.

As shown in FIG. 2, a speed-responsive power steering system for use on a motor vehicle comprises a power steering apparatus 30 including a valve housing 31 containing a servo valve therein and a power cylinder 32 connected to valve housing 31. When a steering wheel is turned, the servo valve coupled thereto is actuated to allow fluid under pressure to be supplied from a pump 35 through an inlet port 33 into one of the chambers in power cylinder 32, while at the same time fluid is discharged out of the other cylinder chamber through an outlet port 34 into a reservoir or tank 36.

A linear solenoid-operated valve SV of the present invention is mounted on power cylinder 32 for selectively providing fluid communication between the chambers in power cylinder 32 in response to the speed of travel of the motor vehicle in which the power steering system is incorporated. Linear solenoid-operated valve SV is connected via a computer CP to a speedometer SM which includes a reed switch (not shown) for generating a pulsed signal dependent on the car speed in response to rotation of a magnet actuated by the output shaft of a transmission (not illustrated). Computer CP converts the pulses signal fed from the reed switch into an electric current dependent on the frequency of the signal or proportional to the speed of travel of the vehicle, and supplies the current to linear solenoid-operated valve SV.

Figure 3:
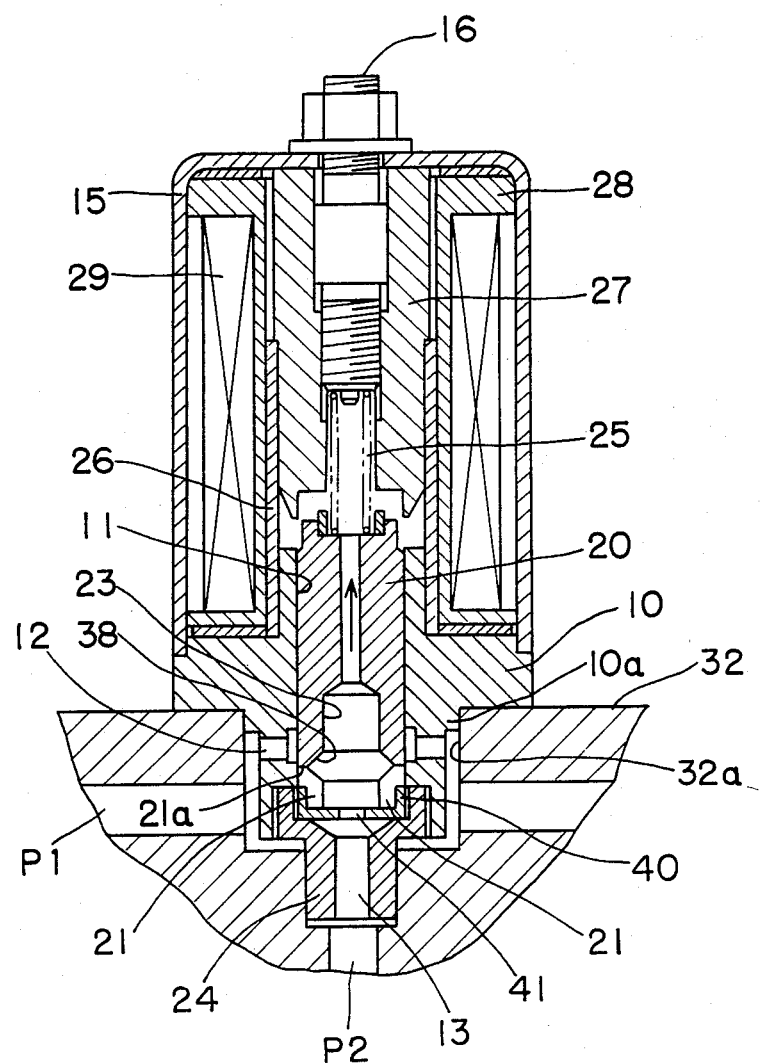
FIG. 3 is a cross-sectional view of the linear solenoid-operated valve shown in FIG. 2.

FIG. 3 shows in detail the construction of linear solenoid-operated valve SV. Linear solenoid-operated valve SV comprises a valve housing 10 of magnetic material having a cylindrical projection 10a fitted in a fluid tight manner in a large-diameter portion of a hole 32a defined radially through a peripheral wall of power cylinder 32. A small-diameter portion of cylindrical projection 10a has a first port 12 opening into a passage P1 in power cylinder 32 which communicates with the left-hand chamber in power cylinder 32, and a bore 11 held in communication with first port 12. A union 24 of nonmagnetic material such as stainless steel is threaded in an inner end of the cylindrical projection 10a, union 24 having an inner end fitted in a small-diameter portion of hole 32a in a fluid tight manner. Union 24 has a second port 13 having one end opening into a passage P2 in communication with the right-hand chamber in power cylinder 32 and the other end opening into bore 11 in valve housing 10.

Valve housing 10 includes an outer projection to which there is fixed, for example by brazing, a sleeve 26 housing a yoke 27 of magnetic material fitted therein. A solenoid or coil 29 is disposed around a bobbin 28 of nonmagnetic material fitted over sleeve 26. Solenoid 29 is covered with a cover 15 of magnetic material having an inner end held in abutment against valve housing 10, cover 15 being secured in position by a screw 16 threaded into an upper end of yoke 27.

A cylindrical spool 20 is made of magnetic material and slidably fitted in bore 11 in valve housing 10. Spool 20 is normally urged to move downwardly into engagement with union 24 in response to the resiliency of a coil spring 25 of stainless steel accommodated in an axial hole in yoke 27.

Figure 4:
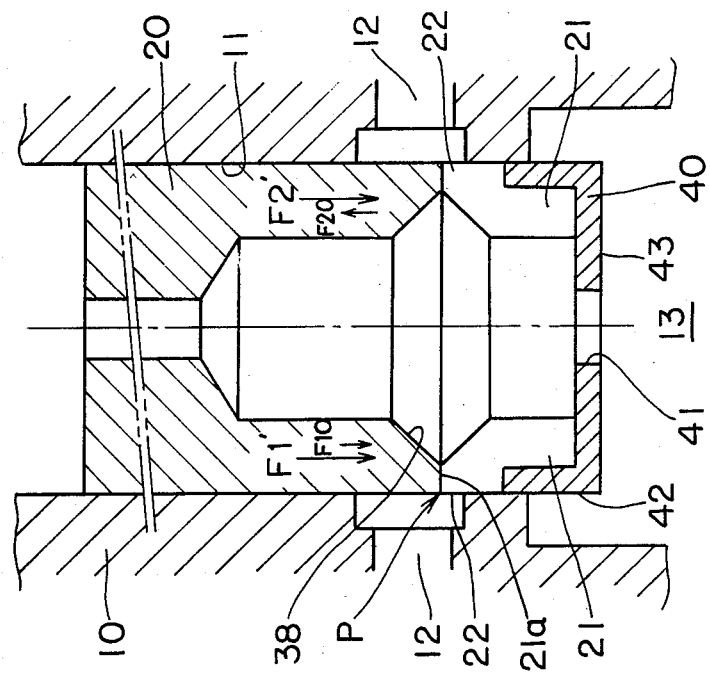
FIG. 4 is an enlarged fragmentary cross-sectional view of the linear solenoid-operated valve.

Spool 20 has an axial through hole 23 and slots 21, 21 formed at one end thereof. As shown in FIG. 4, slots 21 extends radially of spool 20 to open into through hole 23. When spool 20 is in its lowermost position, such blocks communication between first and second ports 12, 13. Upward movement of spool 20 allows fluid to flow through bypass passageways 22, 22 which are defined by side walls and an end wall 21a of slot 21 and a side wall of first port 12. Bypass passageways 22, 22 extend between first and second ports 12, 13 and which is variable as to the degree opening thereof upon axial movement of spool 20.

A chamfer 38 is formed on each end wall 21a of slot 21 in a direction toward through hole 23 as shown in FIG. 4 so as to make the outer edge of each end wall nearly a sharp edge. Chamfer 38 is formed by annular generally V-shaped groove located on interior surface of through hole 23 at a position coincident with end walls 21a, 21a of slots 21, 21. A cylindrical portion 42 of a shallow cup-shaped restrictor member 40 is fixed to the periphery of one end of spool 20, covering the lower opening of through hole 23 and lower portions of slots 21. An orifice 41 is formed at a center portion of an end wall 43 of restrictor member 40.

Operation of the linear solenoid-operated valve SV thus constructed is as follows. When solenoid 29 is supplied with an electric current the magnitude of which is dependent on the speed of travel of the vehicle and which is fed from computer CP, there are generated magnetic fluxes passing through solenoid 29, cover 15, valve housing 10, spool 20, yoke 27, cover 15 and solenoid 29. The magnetic fluxes thus produced cause spool 20 to be shifted in the direction of the arrow (FIG. 3) under an attractive force that is proportional to the current flowing through solenoid 29. Where the speed of the vehicle is lower than a predetermined threshold value, the spool 20 remains in its lower position under the force from coil spring 25, cutting off fluid communication between ports 12, 13 which are led respectively to the chambers in power cylinder 32.

When the motor vehicle runs faster than the predetermined threshold speed, solenoid 29 produces an attractive force which is large enough to overcome the resiliency of spring 25, shifting spool 20 axially in the upward direction. Slots 21, 21 now open into first port 12 to thereby establish the bypass passageway between first and second ports 12, 13. Since the cross-sectional area of the bypass passageway varies linearly dependent on the magnitude of the current flowing through solenoid 29, the amount of a bypassing fluid flowing through the bypass passageway between the chambers in power cylinder 32 will be increased as the car speed becomes higher. The steering force generated by the power steering system, with which the steerable wheels of the vehicle are assisted in being turned, is therefore linearly variable with the speed of travel of the vehicle so as to render the vehicle more stable or heavier with respect to its steering action at higher car speeds.

Figure 1:
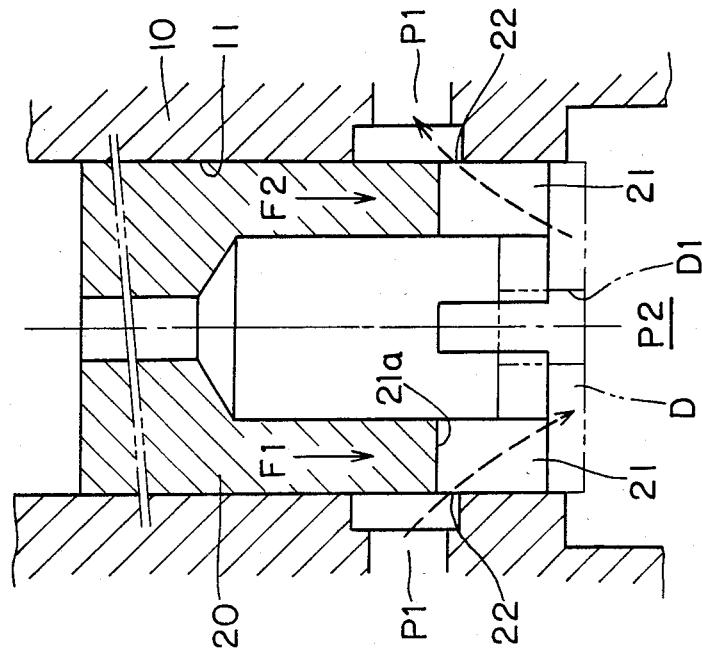
FIG. 1 is a fragmentary cross-sectional view of a conventional linear solenoid-operated valve.

Now, when the pressurized fluid flows from first port 12 to second port 13, insofar as each end wall 21a of slot 21 is formed to be nearly a sharp edge, the stagnation of fluid at end wall 21a is unlikely to appear and, as a result, the rate of change in first reaction force F1' which acts on spool 20 in a direction to throttle bypass passagways 22 as compared with the variation in the degree of opening of bypass passageways 22 is less than that corresponding to reaction force F1 in the conventional valve of FIG. 1. In addition, as the occurrence of stagnation of fluid is decreased at end wall 21a of slot 20 reaction force F1' becomes larger than the conventional reaction force F1. To the contrary, a second reaction force F2' which acts on spool 20 when the pressurized fluid flows from second port 13 to first ports 12 as shown in the right half portion of FIG. 4 is of approximately the same magnitude as reaction force F2 shown in FIG. 1. Accordingly, the difference between reaction forces F1', F2' becomes smaller than that between reaction forces F1, F2.

Moreover, outward deformation of the lower portion of spool 21 is prevented due to the close engagement of restrictor member 40 with the periphery of the end of spool 20 wherein the pressurized fluid flows from second port 13 to first ports 12 and applies the high pressure inside spool 20. Accordingly, variation of resistance to the sliding motion of spool 20 due to the variation of fluid pressure is avoided.

In addition, when fluid flows from first ports 12 to second port 13, a thrust force F10 which is induced by the pressure drop across orifice 41 acts on spool 20 in the direction to close the bypass passageway. To the contrary, when fluid flows from second port 13 to first ports 12, a thrust force F20 is induced by the inverse pressure drop across orifice 41 and acts on spool 20 in the opposite direction to open the bypass passageways 22. Accordingly, the difference between the first and second reaction force F1', F2' is cancelled by thrust forces F10, F20.

Figure 5:
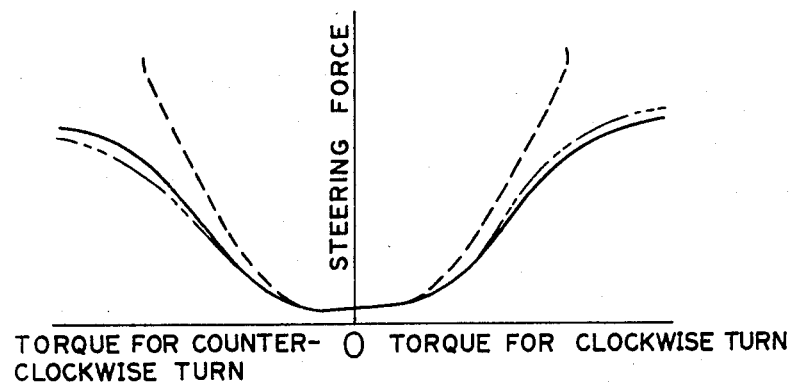
FIG. 5 is a graph showing steering forces generated by the power steering system, as plotted against steering torques.

As a result, the degree of opening of bypass passageways 22 with respect to electric currents supplied to solenoid 29 can be maintained at respective a desired value regardless of the direction of the fluid flow. Namely, first and second steering forces which are respectively generated upon clockwise and counterclockwise turns of the steering wheel are well-balanced as shown by the solid line in FIG. 5, resulting in stabilized maneuvering of the steering wheel. The broken line in FIG. 5 illustrates the situation where the spool 20 remains in its lower position and cuts off the bypass passageways 22, 22.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A solenoid-operated valve, comprising:
    a housing having a bore, a first port opening into the bore and a second port extending coaxially from said bore;
    a cylindrical spool axially slidably disposed in said bore;
    said cylindrical spool having an axial through hole; at least one radial slot formed at one end thereof, said slot opening into said axial through hole and defining in combination with side walls and an end wall thereof and a side wall of said first port a bypass passageway which is operable to a variable degree upon axial movement of said spool in said bore and allows fluid under pressure to flow therethrough from said first port to said second port or vice versa, and a chamfered portion formed on said spool and extending to said slot;
    spring means for urging said spool in a direction to close said bypass passageway;
    a solenoid mounted on said housing for shifting said cylindrical spool in a direction to open said bypass passageway against a resilient force of said spring means, and
    restrictor means provided at said one end of said cylindrical spool and which has an orifice formed therein for restricting flow of fluid therethrough.

2. A solenoid-operated valve as set forth in claim 1, wherein said restrictor means further comprises a cylindrical portion which is fixed to a peripheral portion of said one end of said spool and an end wall within which said orifice is formed.

3. A solenoid-operated valve as set forth in claim 1, wherein said chamfered portion is tapered in a direction toward said axial through hole.

* * * * *